(12) United States Patent
Kobayashi et al.

(10) Patent No.: US 9,657,370 B2
(45) Date of Patent: May 23, 2017

(54) REMOVAL METHOD OF MANGANESE FROM WASTE WATER

(75) Inventors: Hiroshi Kobayashi, Niihama (JP); Norihisa Toki, Niihama (JP); Hirofumi Shoji, Niihama (JP); Keiji Kudo, Niihama (JP); Tatsuya Higaki, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 908 days.

(21) Appl. No.: 12/999,017

(22) PCT Filed: Feb. 23, 2010

(86) PCT No.: PCT/JP2010/052700
§ 371 (c)(1),
(2), (4) Date: Dec. 14, 2010

(87) PCT Pub. No.: WO2010/103913
PCT Pub. Date: Sep. 16, 2010

(65) Prior Publication Data
US 2011/0163042 A1  Jul. 7, 2011

(30) Foreign Application Priority Data

Mar. 9, 2009  (JP) .................................. 2009-054733

(51) Int. Cl.
C02F 1/52 (2006.01)
C22B 3/00 (2006.01)
(Continued)

(52) U.S. Cl.
CPC .............. *C22B 23/043* (2013.01); *C02F 1/74* (2013.01); *C22B 3/44* (2013.01); *C22B 7/006* (2013.01);
(Continued)

(58) Field of Classification Search
USPC .......................... 210/696, 721, 723, 724, 722
See application file for complete search history.

(56) References Cited

U.S. PATENT DOCUMENTS 2,122,735 A * 7/1938 Bellone .......................... 423/605
3,773,916 A * 11/1973 Preisler et al. ............... 423/605
(Continued)

FOREIGN PATENT DOCUMENTS

JP 53-013549 A 2/1978
JP 5-096282 A 4/1993
(Continued)

OTHER PUBLICATIONS

International Search Report of PCT/JP2010/052700, mailing date Apr. 13, 2010.

*Primary Examiner* — Nam Nguyen
*Assistant Examiner* — Claire Norris
(74) *Attorney, Agent, or Firm* — Westerman, Hattori, Daniels & Adrian, LLP

(57) ABSTRACT

A removal method of manganese in which manganese is removed by precipitating manganese selectively from sulfuric acid waste water containing aluminum, magnesium and manganese with inhibiting the precipitation of magnesium.

The removal method of manganese from waste water in which manganese is removed by precipitating manganese selectively from the sulfuric acid waste water containing aluminum, magnesium and manganese with inhibiting the precipitation of magnesium, characterized in that said waste water is subjected to the following steps (1) and (2).

(1) First, aluminum in said waste water is removed.
(2) Subsequently, neutralizing agent is added into the wastewater after removing aluminum, then pH of the waste water is adjusted at 8.0 to 9.0, and oxygen gas is blown.

8 Claims, 5 Drawing Sheets

(51) Int. Cl.
*C02F 1/74* (2006.01)
*C22B 3/44* (2006.01)
*C22B 7/00* (2006.01)
*C22B 47/00* (2006.01)
*C02F 101/20* (2006.01)

(52) U.S. Cl.
CPC .......... *C22B 23/0461* (2013.01); *C22B 47/00* (2013.01); *C22B 47/0045* (2013.01); *C02F 1/5227* (2013.01); *C02F 2101/20* (2013.01); *C02F 2101/206* (2013.01); *C02F 2209/04* (2013.01); *C02F 2209/06* (2013.01); *Y02P 10/234* (2015.11)

(56) References Cited

U.S. PATENT DOCUMENTS

| | | | | |
|---|---|---|---|---|
| 3,808,123 | A * | 4/1974 | Neel et al. | 210/604 |
| 5,505,857 | A * | 4/1996 | Misra et al. | 210/709 |
| 5,756,056 | A * | 5/1998 | Kimura et al. | 423/21.1 |
| 6,656,247 | B1 * | 12/2003 | Genik-Sas-Berezowsky et al. | 75/710 |
| 7,033,507 | B2 * | 4/2006 | Zhuang | 210/714 |
| 7,258,793 | B2 * | 8/2007 | Kurabayashi et al. | 210/617 |
| 7,279,103 | B2 * | 10/2007 | Burckle et al. | 210/610 |
| 7,563,421 | B2 * | 7/2009 | Kobayashi et al. | 423/140 |
| 2005/0265910 | A1 * | 12/2005 | Kobayashi et al. | 423/140 |

FOREIGN PATENT DOCUMENTS

| | | |
|---|---|---|
| JP | 9-248576 A | 9/1997 |
| JP | 11-099389 A | 4/1999 |
| JP | 3225836 B2 | 11/2001 |
| JP | 2005-125316 A | 5/2005 |

* cited by examiner

REMOVAL METHOD OF MANGANESE FROM WASTE WATER

BACKGROUND OF THE INVENTION

Field of the Invention

The present invention relates to a removal method of manganese from waste water. More specifically, the present invention discloses a method in which manganese alone can be efficiently removed by selective precipitation from sulfuric acid waste water containing aluminum, magnesium and manganese, while the precipitation of magnesium is inhibited.

Description of the Prior Art

In treating of industrial waste water, it is a crucial technology to separate heavy metals from the waste water, particularly through precipitation (also called fixation), from an environmental conservation perspective. Among the heavy metal pollutants, fixation of the manganese pollutant in the acidic waste water is particularly difficult. Conventionally, a considerable amount of slurry of industrial calcium hydroxide is used as a neutralizing agent, and the pH of the waste water is adjusted to a value in the range of 8.0 to 10.0 to form the manganese precipitate for easy removal. However, applying this manganese removal method to sulfuric acid waste water containing magnesium and manganese turns out to be problematic, because the amount of neutralizing agent for this reaction greatly exceeds the chemical equivalent amount needed for fixing the manganese. This is because the magnesium sulfate precipitates together with the manganese, unnecessarily consuming the neutralizing agent.

To address this problem, a method for preferentially removing manganese from an acidic solution containing both magnesium and manganese is disclosed (see Patent Literature 1). In the method of Patent Literature 1, when treating a manganese acidic solution containing 1 to 3 g/L of Mn and 2 to 15 g/L of Mg, obtained from the acid-leaching of nickel oxide ore, manganese is preferentially precipitated and removed by controlling the addition of air, oxygen, ozone or peroxide, so that the pH of the solution is adjusted to a value within the range of 8.2 to 8.8, and the oxidation-reduction potential (mV) is within 50 to 300 my. According to this method, manganese is oxidized, and the oxidized manganese is more preferentially neutralized than magnesium so as to be removed in a form of precipitate. The pH value for the method of Patent Literature 1 is about 8.0 after neutralization, under which less magnesium precipitates because most magnesium at pH 8.0 exists as magnesium hydroxide, which has good solubility. Hence, the amount of consumed neutralizing agent is less than the conventional method.

However, when the method of Patent Literature 1 is applied to an acidic solution containing aluminum in addition to magnesium and manganese, magnesium co-precipitates with manganese. Therefore, the method of Patent Literature 1 still has the problems of requiring an excessive amount of neutralizing agent, an increased amount of treating time, and co-precipitation of magnesium with manganese. The co-precipitation of Mn and Mg prevents easy utilization of the precipitated manganese.

From the above introduction, it is clear that a method of removing manganese selectively while inhibiting the precipitation of magnesium in treating the sulfuric acid waste water containing aluminum, magnesium and manganese is needed.

PRIOR ART LITERATURE

Patent Literature

Patent Literature 1: JP-3225836 (page 1);

SUMMARY OF THE INVENTION

The present invention aims at resolving the above-mentioned technical problem, and provides an efficient method for removing manganese by selective precipitating manganese from sulfuric acid waste water containing aluminum, magnesium and manganese while inhibiting the precipitation of magnesium.

To achieve the above object of removing manganese alone from a sulfuric acid waste water containing aluminum, magnesium and manganese, the inventors of the present invention have conducted intensive research. It was found that when aluminum and magnesium co-exist in the waste water, aluminum co-precipitates magnesium by forming a complex hydroxide like a hydrotalcite. Consequently, the amount of consumed neutralizing agent increases. To prevent this problem, the present invention discloses that the aluminum should be removed from the waste water first; then neutralizing agent is added into the waste water to adjust the pH to a value within the range of 8.0 to 9.0; and the oxidizing neutralizing treatment comprising adding oxygen gas into the waste water is carried out; and finally the manganese is selectively precipitated and removed while the precipitation of magnesium is inhibited.

In other words, the first aspect of the present invention provides a method of selectively precipitating and removing manganese from a sulfuric acid waste water containing aluminum, magnesium, and manganese while inhibiting the precipitation of magnesium. The method comprises:

(1) First, removing aluminum from the waste water.

(2) Subsequently, adding neutralizing agent into the waste water after the aluminum removal so that the pH of the waste water is adjusted to a value within the range of 8.0 to 9.0, and adding oxygen gas into the waste water.

According to the second aspect of the present invention, the method of the first aspect, wherein step (1) of the method further comprises adding calcium carbonate or calcium hydroxide as a neutralizing agent to adjust the pH to a value within the range of 4.0 to 6.0.

According to the third aspect of the present invention, the method of the first aspect, wherein step (2) of the method further comprises adding neutralizing agent so that the pH reaches an equilibrium first, then adding oxygen gas into the waste water.

According to the fourth aspect of the present invention, in the method of the first aspect, wherein in step (2) a high-pressure vessel is used when adding oxygen gas into the waste water.

Also, according to the fifth aspect of the present invention, the methods according to any one of the first to the fourth invention, wherein the waste water is discharged from a sulfide precipitation step in processing nickel oxide ore. In a hydrometallurgical process to recover nickel and cobalt from nickel oxide ore, High Pressure Acid Leach process, in which sulfuric acid is added to nickel oxide ore, yields a leach solution. In a subsequent sulfide precipitation step, in which sulfides of nickel and cobalt is separated and recovered by adding hydrogen sulfide gas into the mother liquid after neutralizing the leach solution, the waste water is discharged from said sulfide precipitation step.

The removal method of manganese from the waste water of the present invention has a significant industrial value, because manganese alone can be efficiently removed, in such a way that manganese is selectively precipitated from sulfuric acid waste water containing aluminum, magnesium and manganese, while the precipitation of magnesium is inhibited. Further, according to step (2) of the present invention, the neutralizing agent is first added into the waste water so that a pH equilibrium is reached, then oxygen gas is added into the waste water. Consequently, the amount of consumed neutralizing agent can be reduced. In addition, the oxidation step can be promoted by increasing amount of oxygen dissolved in the solution, provided that the high-pressure vessel is used.

DETAILED DESCRIPTION OF THE INVENTION

Hereinafter, the method of removing manganese selectively from the waste water of the present invention is described in details.

The method of the present invention is a method of selectively precipitating and removing manganese from the sulfuric acid waste water containing aluminum, magnesium and manganese, while inhibiting the precipitation of magnesium. The waste water is subjected to the following steps (1) and (2).

(1) First, removing aluminum from the waste water;

(2) Subsequently, adding neutralizing agent into the waste water so that pH of the waste water is adjusted to a value in the range of 8.0 to 9.0, and adding oxygen gas into the waste water by blowing.

In the present invention, it is important that the step of removing aluminum in the waste water (Step (1)) is conducted prior to the step of removing manganese in the waste water by neutralization (Step (2)).

The above step helps excluding the influence of aluminum, so that manganese can be selectively precipitated while inhibiting the precipitation of magnesium. It should be noted that, in Step (1), aluminum concentration in the waste water after the removal of aluminum is not particularly limited, and can be determined based on the acceptable amount of contamination of magnesium and aluminum into the manganese precipitate in Step (2). The aluminum concentration after the aluminum removal step is preferably 0.1 g/L or less, and more preferably, 0.01 g/L or less.

That is, in a conventional technique, the oxidation neutralization treatment is carried out by adding the oxidizing agent at the pH value within the range of 8.2 to 8.8. The aluminum in the waste water precipitates by forming complex hydroxides such as hydrotalcite, instead of a simple hydroxide. In this conventional method, the treatment results in the formation of a complex hydroxide containing the co-precipitated magnesium, and the ratio of the precipitated magnesium to aluminum is 6:1. Since the manganese precipitates with the above-mentioned complex hydroxide, it is impossible to remove manganese selectively with the precipitation of magnesium inhibited even with enhanced oxidation treatment. Therefore, in treating waste water having a high magnesium to manganese content ratio with the conventional method, the complex hydroxide contains considerable amount of magnesium is generated, resulting in an increased amount of neutralizing agent consumption.

In the following paragraph, the above effect of aluminum on the precipitation of magnesium is specifically described.

A sulfuric acid solution containing 3.4 g/L of Mn, 8.4 g/L of Mg, and 0.5 to 2.0 g/L of Al is added into a reactor (volume: 0.2 L). While the temperature of the solution is maintained at 50° C., slurry of calcium hydroxide having a concentration of 20% by mass is added into the solution to adjust the pH to 8.0, and pure oxygen gas is blown into the solution. The solution is left standing for 30 minutes.

As a result, the ratio of the removal amount of magnesium to the removal amount of aluminum (molar ratio) can be as high as 2, even at a pH value at which magnesium hydroxide alone cannot be formed as precipitate. The precipitation of magnesium under the above-described condition is probably due to formation of a complex hydroxide such as a hydrotalcite.

In the above removal method, step (1) is not particularly limited. Various separation methods through which aluminum can be separated and removed from the sulfuric acid waste water containing aluminum, magnesium and manganese can be used. Among them, it is preferred to use the neutralization method in which cheap calcium carbonate or calcium hydroxide is added as neutralizing agent to adjust the pH at 4.0 to 6.0. Here, if the pH value is less than 4.0, the generation of aluminum precipitate is insufficient; if the pH value is more than 6.0, aluminum co-precipitates with magnesium due to the local increase of pH caused by the neutralization agent. In the above mentioned pH range of 4.0 to 6.0, aluminum precipitates in the form of aluminum hydroxide, and the amount of neutralizing agent consumption can be equal to the theoretical equivalent.

The concentration of aluminum in waste water after removal of aluminum can be 0.01 g/L or less.

In the above removal method, step (2) is the step to remove manganese in the form of precipitate by oxidizing manganese from divalent to trivalent. Neutralizing agent is added into the waste water after the removal of aluminum in step (1), to adjust the pH to a value within the range of 8.0 to 9.0, and oxygen gas is added into the waste water, so that manganese is removed as precipitate. In one embodiment, neutralizing agent is added first to reach the pH equilibrium, then oxygen gas is added into the waste water by blowing. That is, the addition of solid neutralizing agent having slow reactivity makes it possible to add oxygen gas into the waste water by blowing after the solution reaches the pH equilibrium, and consequently reduces the amount of neutralizing agent consumption.

Here any chemicals having stronger oxidizing ability than that of air, such as oxygen gas, ozone, peroxides can be used as the oxidizing agent. Oxygen gas is preferred. And particularly, industrial oxygen gas having a purity of about 98% or more is preferred. The amount of the blown oxygen gas should be sufficient for oxidizing manganese in the solution from divalent to trivalent.

It is noted that, although the above neutralizing agent is not particularly limited, industrially cheap slurry of calcium hydroxide is preferable.

For step (2), it is preferable to provide a designated vessel for neutralization and exclusive designated vessel for oxidation respectively. The retention time in the above vessel for neutralization is preferably 30 minutes or more in an industrial application to reach the pH equilibrium, when slurry of calcium hydroxide is used. By using this designated vessel, magnesium is not fixed as hydroxide on the solid surface of calcium hydroxide, where the pH value is high. Therefore, the amount of neutralization agent consumed by magnesium can be controlled. In addition, because the amount of manganese, which co-precipitates in the precipitate as divalent hydroxide without being oxidized, can be reduced, removal of manganese can be carried out with more certainty reducing equilibrium concentration of manganese.

In the above step (2), it is preferable to blow the oxygen gas with a high-pressure vessel when adding oxygen gas into the waste water for oxidation. High-pressure vessel is used to increase the partial pressure of oxygen, and consequently the amount of dissolved oxygen in the solution for accelerating the oxidation, because oxygen gas is generally difficult to be dissolved in the solution having high salt concentration like the waste water. When the partial pressure of oxygen is low, the oxidation rate of manganese is affected by this partial pressure. Thus, the oxidation is preferably carried out under the suitable partial pressure of oxygen to obtain the desired oxidation rate.

The sulfuric acid waste water containing aluminum, magnesium, and manganese to be used in the above removal method is not particularly limited, but it is preferable that the waste water contains aluminum of a concentration at which aluminum and magnesium co-precipitate at an undesired level when manganese is generated as precipitate by the above treatment of oxidation neutralization. For example, the method is particularly useful in treating a waste water containing magnesium at the same or higher concentration than that of manganese, and aluminum at $1/100$ or higher concentration than that of manganese.

The waste water to be treated by the present method is not particularly limited. The preferred waste water to be treated with this method includes, for example, the waste water discharged from the sulfide precipitation step of the leach solution in the hydrometallurgical process of recovering nickel and cobalt from nickel oxide ore, in which a High Pressure Acid Leach comprising a leaching step of nickel oxide ore by sulfuric acid is involved.

The above mentioned hydrometallurgical method comprises for example, a leaching step, in which leach solution containing impurity element in addition to nickel and cobalt can be obtained by leaching nickel oxide ore with sulfuric acid under an elevated pressure at a high temperature; a neutralization step, in which calcium carbonate is added to said leach solution to form a neutralization precipitate slurry including Fe(III), and a mother liquid that can be used for nickel recovery; a sulfide precipitation step, in which hydrogen sulfide gas is added to said mother liquid to generate, separate and recover sulfides of nickel and cobalt; and the treatment step of waste water after separating said sulfides. The resultant waste water is, for example, sulfuric acid solution containing 2 to 6 g/L of Mn concentration, 3 to 12 g/L of Mg concentration, and 2 to 6 g/L of Al concentration, and is preferably subject to the removal method of the present invention.

EXAMPLES

In the following paragraph, the present invention is described in more detail by using examples and comparative examples. However, the present invention is not to be limited by these examples. It is noted that, metal analysis used in examples and comparative examples are carried out by ICP emission spectrometry.

Example 1

First, Step (1) removal of aluminum was carried out with waste water having 2.90 g/L of Mn, 7.81 g/L of Mg, 2.90 g/L of Al, and 0.40 g/L of Fe, which was obtained from sulfide precipitation step in hydrometallurgical process by the above-mentioned High Pressure Acid Leach in the reactor (volume: 2 L). Slurry of calcium hydroxide having a concentration of 20% by mass was added to adjust the pH value of the waste water to 4.5 (neutralization treatment). After the neutralization treatment, aluminum was removed, resulting in the waste water having an aluminum concentration was of 0.01 g/L or less after the aluminum removal.

Figure 1:
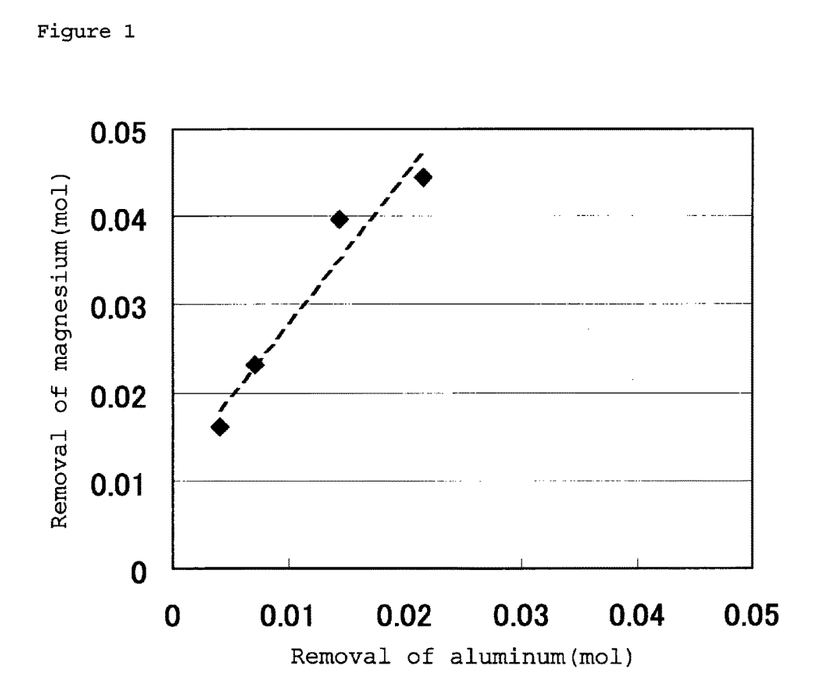
FIG. 1 shows a relationship between the amount of removed magnesium and the amount of removed aluminum.
Figure 2:
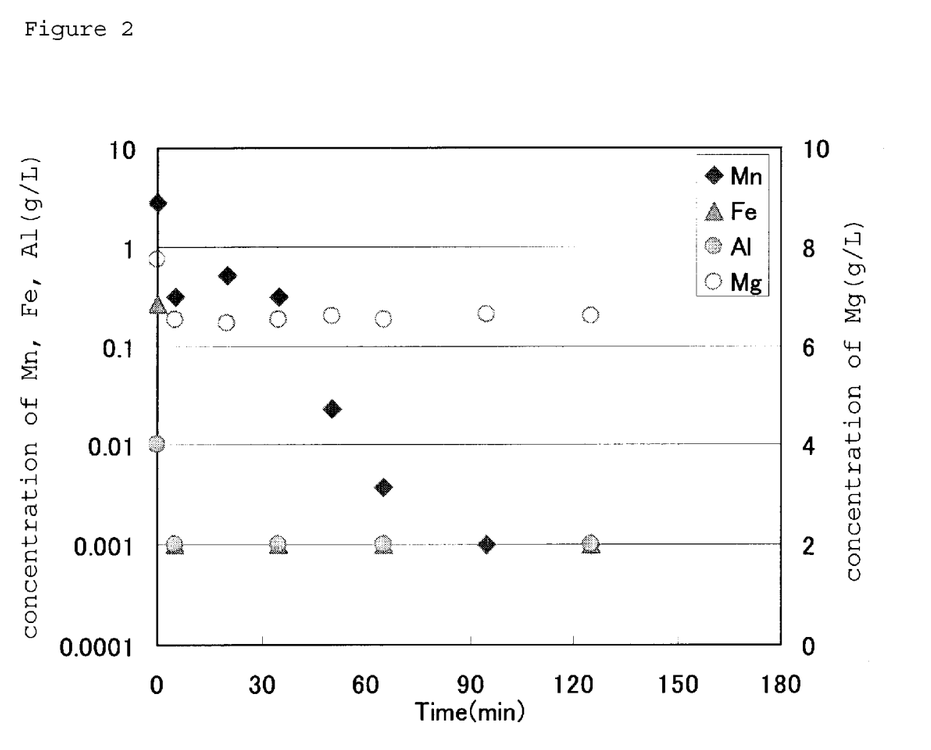
FIG. 2 shows a change of Mn concentration, Mg concentration, Al concentration and Fe concentration in the solution relative to the retention time.

Subsequently, Step (2) removal of manganese was carried out by maintaining the waste water after the aluminum removal in the reactor (volume: 2 L) at a temperature of 50° C., adding slurry of calcium hydroxide having a concentration of 20% by mass to adjust the pH of the solution to 8.0, and adding oxygen gas into the waste water by blowing at a rate of 1,000 mL/minute. Various retention times were used, and the concentrations of Mn, Mg, Al and Fe in the solution corresponding to the retention time points were measured. The results are shown in FIG. 2. FIG. 2 shows the changes of Mn, Mg, Al and Fe in the solution at various retention time points.

FIG. 2 demonstrates that in the waste water after the aluminum removal, manganese was reduced to low concentration over time. On the other hand, concentration change of magnesium was small. That is, manganese was selectively removed without magnesium precipitation. It should be noted that, a decrease of the concentration of magnesium was observed at the beginning of the reaction. This was caused by the local formation of magnesium hydroxide, whose concentration exceeded the upper limit of its solubility in this solution, resulting in immediate precipitation.

Example 2, Comparative Example 1

Figure 3:
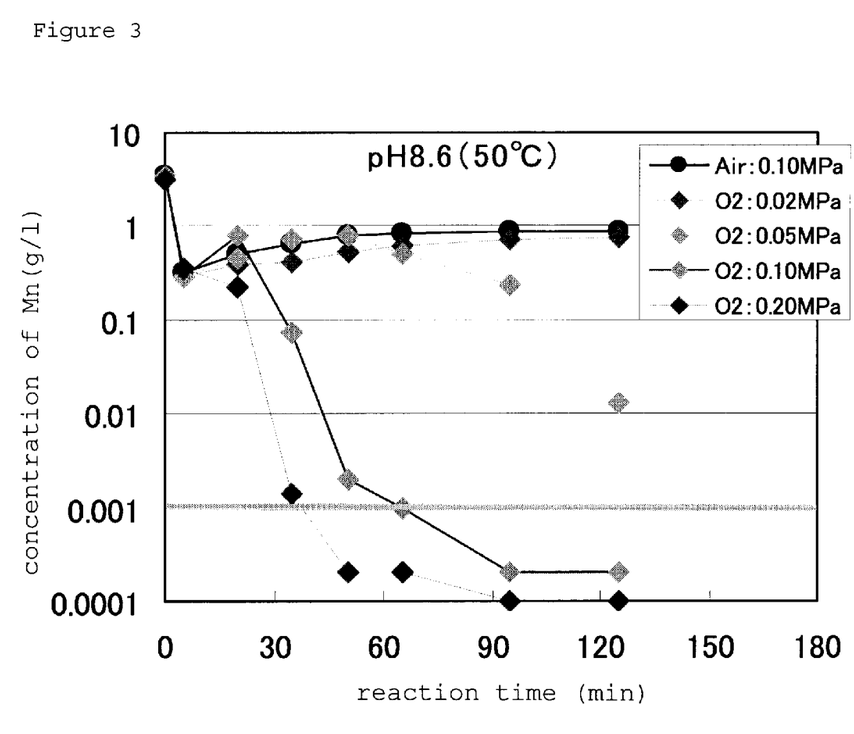
FIG. 3 shows a change of Mn concentration relative to the holding time (reaction time) in the presence of air or pure oxygen gas of different pressures.
Figure 4:
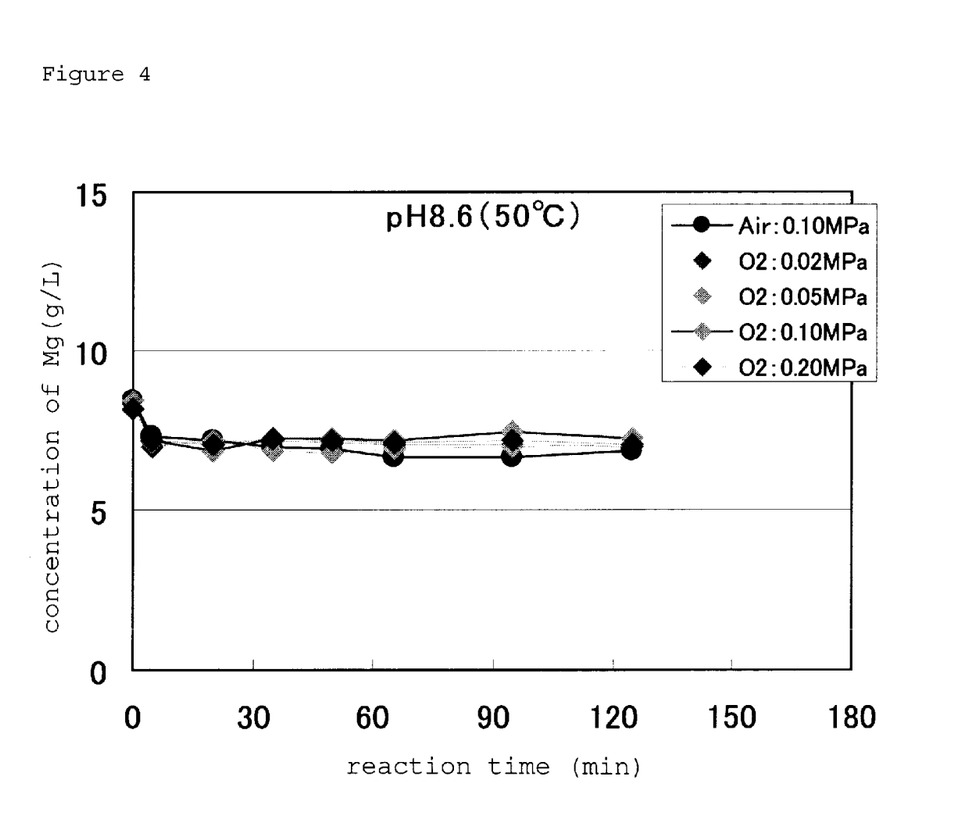
FIG. 4 shows a change of Mg concentration relative to the holding time (reaction time) in the presence of air or pure oxygen gas of difference pressures.

In Comparative Example 1, the waste water treatment was carried out in the same manner as in Example 1, except that in Step (2) removal of manganese, the slurry of calcium hydroxide was added before oxidation reaction to adjust the pH to 8.6, and the oxygen gas was adjusted to different pressures varying from 0.02 to 0.2 MPa or replaced by air. The concentrations of Mn and Mg in the solution were measured. Results are shown in FIGS. 3 and 4. FIG. 3 shows the change of Mn concentration in response to retention time (reaction time) variation under different oxygen gas pressure and in air. FIG. 4 shows the change of Mg concentration in response to the retention time (reaction time) variation under different oxygen gas pressure and in air.

It is shown in FIG. 3, that the oxidation precipitation of manganese is accelerated by the pressure increase of the oxygen gas, and reduction lower limit can be surely decreased. On the other hand, it is shown that in case of using air as the oxidizing agent (comparative example 1), the reaction rate is slower than that of the oxygen gas.

FIG. 4 shows that the magnesium concentration of the solution is not reduced to or under the certain amount of solubility determined by pH. In other words, the present method provides excellent selectivity in precipitation of manganese over magnesium.

Comparative Example 2

Figure 5:
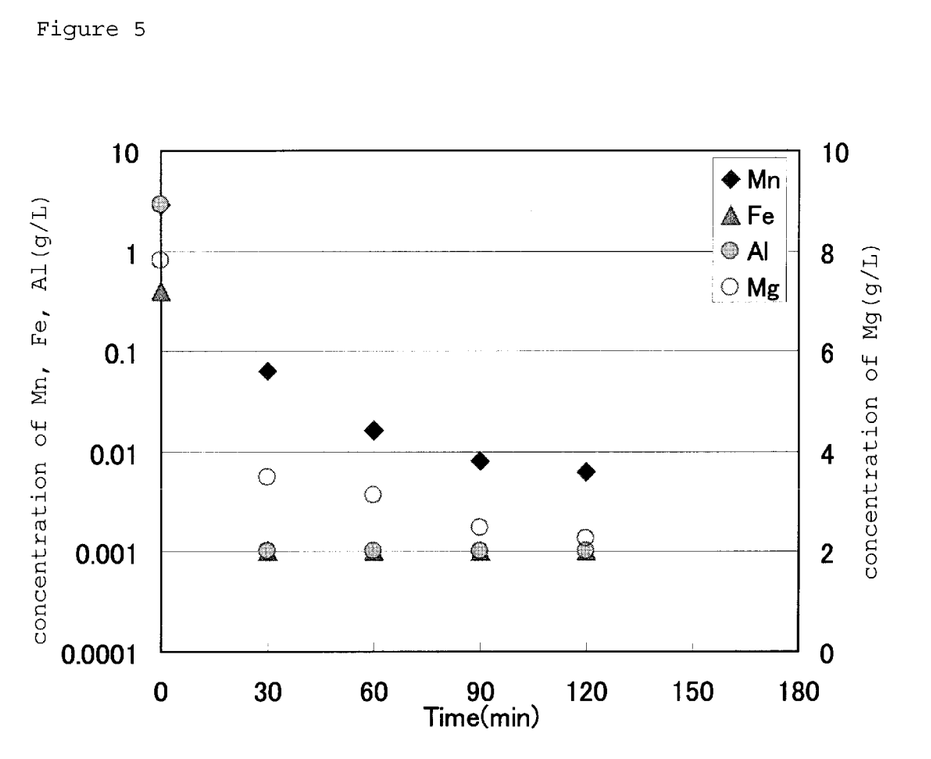
FIG. 5 shows a change of Mn concentration, Mg concentration, Al concentration and Fe concentration in the solution relative to the holding time.

Comparative Example 2 was carried out in the same manner as Example 1, except that Step (1) removal of aluminum was not carried out. The concentrations of Mn, Mg, Al and Fe in the solution were measured. Results are shown in FIG. 5. FIG. 5 shows the changes of Mn, Mg, Al and Fe concentrations in the solution in response to the retention time.

FIG. 5 demonstrates that when aluminum is present in the waste water, magnesium is more preferentially precipitated than manganese.

From the above, in examples 1 or 2, to remove manganese from sulfuric acid waste water containing aluminum, magnesium and manganese, aluminum in the waste water needs to be removed first. After removing aluminum, neutralization agent is added to the waste water to adjust the pH to a value within the range of 8.0 to 9.0. Finally, oxygen gas is added into the waste water by blowing. It is shown that according to the method of the present invention, the manganese can be selectively precipitated and efficiently removed while magnesium precipitation is inhibited. On the other hand, Comparative Examples 1 and 2 show that when air was used instead of oxygen gas, or if the aluminum removing step was omitted, satisfying results were not obtained.

As is clear from above, the method of removing manganese from the waste water can be used for removing heavy metals from the waste water containing aluminum and magnesium, because manganese can be selectively removed over magnesium when manganese is removed from sulfuric acid waste water containing aluminum, magnesium and manganese.

What is claimed is:

1. A method of removing manganese from a sulfuric acid waste water in which manganese is removed by precipitating manganese selectively from the sulfuric acid waste water containing aluminum, magnesium and manganese, comprising:
   (1) First, removing aluminum from said sulfuric acid waste water so that a concentration of aluminum is 0.1 g/L or less;
   (2) Subsequently, adding neutralizing agent into the sulfuric acid waste water after removing aluminum and adjusting a pH value of the sulfuric acid waste water to no less than 8.0 and less than 9.0; and
   (3) adding oxygen gas with a purity of 98 volume % or more into the sulfuric acid waste water,
   wherein manganese is precipitated in steps (2) and (3), and
   wherein in step (2), the pH value of the sulfuric acid waste water is adjusted to reach an equilibrium by adding neutralizing agent, prior to step (3) of adding the oxygen gas into the sulfuric acid waste water under a pressure load of 0.10 MPa to 0.20 MPa.

2. The method of removing manganese from the sulfuric acid waste water according to claim 1, wherein in step (1) a pH value of the sulfuric acid waste water is adjusted to 4.0 to 6.0 by adding calcium carbonate or calcium hydroxide as a neutralizing agent.

3. The method of removing manganese from the sulfuric acid waste water according to claim 1, wherein a pressurized vessel is used when adding oxygen gas into the sulfuric acid waste water in step (3).

4. The method of removing manganese from the sulfuric acid waste water according to claim 1,
   wherein said sulfuric acid waste water is obtained from a sulfide precipitation step;
   wherein the sulfide precipitation step is a step in a hydrometallurgical process in which nickel and cobalt are recovered from nickel oxide ore by High Pressure Acid Leach, comprising a leaching step in which a leach solution is obtained by leaching nickel oxide ore with sulfuric acid; and the sulfide precipitation step in which sulfides of nickel and cobalt are separated and recovered by adding hydrogen sulfide gas into a mother liquid obtained by neutralizing the leach solution.

5. The method of removing manganese from the sulfuric acid waste water according to claim 4, wherein in step (1) a pH value of the sulfuric acid waste water is adjusted to 4.0 to 6.0 by adding calcium carbonate or calcium hydroxide as a neutralizing agent.

6. The method of removing manganese from the sulfuric acid waste water according to claim 4, wherein in step (2), the pH value of the sulfuric acid waste water is adjusted to a range of 8.0 to 9.0 by adding neutralizing agent, prior to step (3) of adding oxygen gas into the sulfuric acid waste water.

7. The method of removing manganese from the sulfuric acid waste water according to claim 4, wherein a pressurized vessel is used when adding oxygen gas into the sulfuric acid waste water in step (3).

8. The method of removing manganese from the sulfuric acid waste water according to claim 1, wherein in step (2), the pH value of the sulfuric acid waste water is adjusted to a range of 8.0 to 9.0 by adding neutralizing agent, prior to step (3) of adding oxygen gas into the sulfuric acid waste water.

* * * * *